Aug. 6, 1968   R. K. ANDERSON ET AL   3,396,241
STETHOSCOPE WITH SOUND SPECTRUM SELECTION
Filed Oct. 23, 1964   2 Sheets-Sheet 1
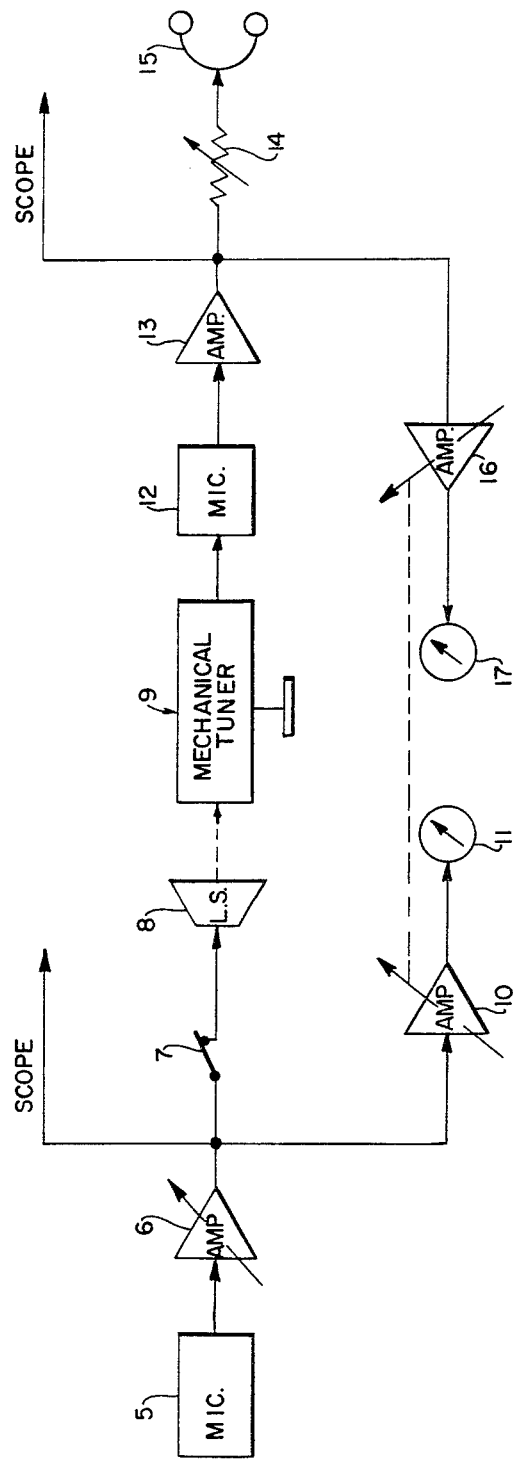
INVENTORS
RUSSELL K. ANDERSON
LLOYD C. SANFORD
BY
Darby & Darby
ATTORNEYS Aug. 6, 1968    R. K. ANDERSON ET AL    3,396,241
STETHOSCOPE WITH SOUND SPECTRUM SELECTION
Filed Oct. 23, 1964    2 Sheets-Sheet 2

INVENTORS
RUSSELL K. ANDERSON
LLOYD C. SANFORD
BY
*Darby & Darby*
ATTORNEYS

United States Patent Office 3,396,241
Patented Aug. 6, 1968

3,396,241
STETHOSCOPE WITH SOUND
SPECTRUM SELECTION
Russell K. Anderson, P.O. Box 197   07075, and Lloyd C.
Sanford, 202 Woodland Ave.   07070, both of Rutherford, N.J.
Filed Oct. 23, 1964, Ser. No. 406,088
10 Claims. (Cl. 179—1)

ABSTRACT OF THE DISCLOSURE

In a stethoscope for detecting a narrow band of audio frequencies, sound is converted to electrical signals, amplified and reconverted to sound at the input of a tunable cavity type filter. The acoustical output of the filter is sensed, amplified, and again converted to sound. A set of meters is provided to compare filter input with filter output.

---

This invention relates to stethoscopes, and, in particular, to a stethoscope of particular use in medical applications for analyzing or "listening" to selected audio frequencies.

In the medical profession, it is often desirable for doctors to listen to a selected spectrum of audio energy. For example the heart beat of an unborn fetus is extremely difficult to detect, due in great measure to the inability of present stethoscopes to distinguish between the heart beats of the fetus and of the mother. It is known, however, that the fetal heart beat includes different acoustical frequencies from that of the mother; therefore, it would be possible to listen to the former by filtering out the undesired audio spectrum portion. Furthermore, for many other analytical or diagnostic purposes, it may be desirable to focus on a particular audio spectrum portion, as distinguished from the entire output audio frequency range of the sources in question.

Accordingly, the main object of the present invention is to provide a stethoscope capable of "listening" to a selected frequency spectrum portion.

Another object of the invention is to provide a stethoscope which is relatively simple and trouble free yet capable of distinguishing various audio spectrum portions.

Another object of the invention is to provide a stethoscope for medical purposes, wherein mechanically tunable filter devices may be used to filter out unwanted frequencies.

Still another object of the invention is to provide a stethoscope in which a visual indication may be had of the relative strength of a selected audio spectrum portion compared to the entire instrument range of audio frequencies.

Yet another object is to provide a stethoscope in which an indication is given of the spectrum portion selected, and wherein sensitivity of the device may be varied.

Briefly, in accordance with the invention, the audio frequency range produced by the source to be analyzed is coupled to a mechanical tuner including a resonant chamber, the resonant frequency of which may be varied by means of a tuning knob or the like. When the chamber is adjusted for a particular frequency range or spectrum portion, the input acoustical energy within that spectrum portion is selectively transmitted through the tuner and piped to a microphone, in turn coupled through an amplifier to a set of headphones and a meter. The doctor, or other user, can thereby listen to only those frequency components within the selected spectrum portion. The meter affords a visual indication of the relative magnitude of the signals within this spectrum portion. The tuning knob may be mechanically coupled to a movable dial which cooperates with a graduated scale to indicate the relative displacement of the mechanical tuning member, and thus the frequency spectrum to which the stethoscope is tuned.

The manner in which the above and other objects of the invention are accomplished is more fully described below with reference to the attached drawing, wherein:

FIGURE 1 is a schematic diagram of a preferred embodiment of the invention;

FIGURE 2 is a side view, partially in section, showing a preferred construction of the mechanical tuner;

FIGURE 3 is a sectional view along the line 3—3 of FIGURE 2; and

FIGURE 4 is an end view of the preferred tuner.

FIGURE 1 schematically illustrates a preferred embodiment of the invention in which the full range audio input is detected by a conventional acoustical-electrical transducer or microphone 5 and the electrical output coupled to a variable gain amplifier 6. The output voltage from amplifier 6 is fed through a normally closed single pole, single-throw switch 7 to an electrical-acoustical transducer such as a miniature loudspeaker 8.

As illustrated by dashed lines, the vibrations of transducer 8 are mechanically coupled to an adjustable mechanical tuner 9 which is tuned so that it passes only a selected spectrum portion of audio signals, as explained in detail below with reference to FIGURES 2–4, severely attenuating all frequencies outside of that spectrum. The signal voltage of amplifier 6 is also coupled through a second variable gain meter amplifier 10 to a voltmeter 11 which may be of conventional construction. Meter 11 thus provides an indication of the magnitude of the full range of acoustical signals detected by microphone 5.

The output of mechanical tuner 9 is an acoustical signal within a selected audio spectrum portion determined by the adjustment of tuner 9. This acoustical energy is detected by a microphone 12 and converted to a corresponding voltage which is fed through a constant gain amplifier 13, and an attenuator or volume control 14 to a set of headphones 15 or the like. Thus, the person listening at headphones 15 hears essentially only those sounds corresponding to the selected audio spectrum portion to which mechanical tuner 9 has been tuned.

The signal voltage of amplifier 13 is also fed through a variable gain meter amplifier 16 to a second voltmeter 17 which indicates the relative amplitude of the acoustical signals within the selected audio spectrum portion. The use of the two meters 11 and 17 is a desirable feature since it enables the user to visually compare the amplitude of the acoustical signals in the selected spectrum portion (as indicated by meter 17) with the magnitude of the acoustical energy within the total audio frequency range (as indicated by meter 11).

Since there will be considerable losses in the system between the output of amplifier 6 and microphone 12 due to the energy conversions and the components themselves, amplifier 13 is in this preferred embodiment inserted in the chain to compensate for such losses. The gains of amplifiers 13, 10 and 16 are preset to a level such that when mechanical tuner 9 is adjusted to pass a particular frequency, and a tone of that frequency is coupled to microphone 5, meters 11 and 17 will have identical readings. To maintain this relationship for any setting of amplifiers 10 and 16, it is necessary that amplifiers 10 and 16 insert corresponding amounts of gain into the system. This is accomplished by having the conventional gain control knobs of the two amplifiers 10 and 16 mechanically linked together as indicated by a dashed line in FIGURE 1. Therefore, if it is necessary to increase the gain of amplifier 16 to obtain a clear reading of the selected spectrum portion, the gain of amplifier 10 is simultaneously increased by an identical amount. Thus, at all times after the device has been properly calibrated, the comparative readings of meters 11 and 17 will manifest the relative strength of the desired audio spectrum portion relative to the entire input audio frequency range.

The invention has particular utility in the identification of repetitive sounds such as heart beats, since they will appear as respective pulses in meters 11 and 17. Thus, if meter 11 indicates that the input acoustical energy is in the form of pulses, the user can adjust mechanical tuner 9 until the readings of meters 11 and 17 are the same, or the two meters indicate the same peak at the same time. The use of two meters provides a significant advantage in that it enables the user to examine very low frequncy or sub-audible signals, which would not be detectable by headphones alone. With the circuit above described, even very low audio frequencies will cause a reading on the meters (or oscilloscope or other recording equipment).

The amplifiers 6, 10, 13 and 16 are conventional audio amplifiers of either the electron tube or, preferably, the transistor type. Amplifiers 6 and 13 may be provided with output terminals to couple their respective outputs to an oscilloscope or other analyzing instrument to further analze the signals in the selected spectrum portions and/or the entire frequency band. The amplifiers obviously should have relatively little distortion or non-linearity in the audio range of concern (typically 30 to 10,000 cycles per second). As explained below, the purpose of switch 7 is to disconnect microphone 5 from the input to tuner 9 if it is desired to directly introduce the acoustical signals into the mechanical tuner.

Although of particular use for medical purposes, the invention may also be used industrially to analyze performance characeristics such as vibration, alignment of machinery parts, pipe leaks, material flow, etc.

In a preferred embodiment illustrated in FIGURES 2–4, the mechanically tunable filter is similar to known constructions and consists of a cylindrical metallic housing 20 having a circular axial tunnel 22 therethrough. Tunnel 22 opens into an enlarged recess 24 at the forward extremity of housing 20, and is capped by a plastic dome 26 which is screwed onto the end of housing 20.

The outer rim of loudspeaker 8 is conventionally secured to a disc 28 which transmits the loudspeaker vibrations through a transmitting rod 30, passing through an annular sleeve 31 in dome 26, to an integral transverse circular diaphragm 32 within recess 24. The periphery 33 of diaphragm 32 is bevelled slightly, and in its illustrated position, rests in a contingent relationship with an O-ring 34 situated toward the bottom of recess 24.

The theory of operation of the tuner insofar as it is understood, is that when diaphragm 32 is touching O-ring 34, the chamber 35, thus formed, acts as a resonant chamber for a narrow band of frequencies corresponding to a desired audio spectrum portion. The axial displacement of diaphragm 32 within chamber 24 determines the audio spectrum portion to which mechanical tuner 9 is tuned, since movement thereof selectively increases or decreases the volume of chamber 35, thus altering its resonant frequency.

The diaphragm position within chamber 35 is controlled through a central shaft 36 concentrically located within tunnel 22. The forward end of shaft 36 is integrally formed with diaphragm 32, and the rearward extremity of the shaft 36 terminates in a screw portion 38 which is received in a suitable threaded bore 40 within a cylindrical connector 41. The connector 41 is rotatably received in an annular bearing member 42 which is screwed into the rearward end of housing 20.

A control shaft 43 includes a threaded extremity 44 which is screwed into connector 41 to form a permanent engagement after the connector and bearing 42 have been properly located within housing 20. A flange 45 connected to shaft 43, and a shoulder 46 of connector 41 prevent movement of the central shaft 36 along the tuner axis.

The entire mechanical tuner 9, as illustrated in FIGURE 2, is mounted within a control box by suitable means (not illustrated). The control box itself may also be of conventional form, and is not illustrated in detail, although the front panel of such a control box is illustrated schematically at 47. The control shaft 43 extends through a suitable bore 48 in the front panel 47 and terminates in a knurled control knob 49 exterior of the control box. Knob 49 may thus be conveniently manipulated by the user to adjust the frequency to which the stethoscope is tuned.

The rotation of diaphragm 32 and central shaft 36 is prevented by a small pin 51 extending from the inner surface of the diaphragm into a resilient gasket 52 within a bore hole 53 at the bottom of chamber 35, or in any other convenient manner. Thus, when the user turns knob 49, rotating shaft 43 and connector 41 connected thereto, the threaded engagement of screw portion 38 and bore 40 causes central shaft 36 and diaphragm 32 to move in an axial direction depending upon the direction in which the knob 49 is turned. As explained above, movement of diaphragm 32 thereby enlarges or decreases the size of resonant chamber 35 thus altering the frequency to which the device is tuned.

As a further feature of the invention, means are provided to indicate to the user the extent to which diaphragm 32 has been moved and thus the spectrum portion to which tuner 9 is adjusted. For this purpose there is provided a disc-like indicator dial 55 including an annular collar 56, which receives the portion of control shaft 43 exterior of control panel 47, and a peripheral flange 57 which spaces dial 55 away from panel 47. Peripheral flange 57 includes interior teeth in the form of a ring gear 58 (FIG. 3). A pinion 60 is secured to shaft 36 and mechanically coupled to the ring gear 58 through a pair of reduction gears 62 and 64 suitably journalled in the exterior surface of panel 47.

The indicator is physically secured by an annular end cap 66 including a canted peripheral rim 68 in engagement with the outer circumference of dial 55. End cap 66 is suitably secured onto the end of housing 20 as by means of four small screws 70.

As shown in FIG. 4, rim 68 of end cap 66 is graduated and identified as illustrated at 72 and 74, respectively, depending upon the gear reduction between pinion 60 and ring gear 58. The position of an arrow 76, marked on indicator dial 55, with respect to graduations 72 thereby manifests the number of turns of knob 49 and thus the relative position of diaphragm 32 within recess 24.

An elastomeric sleeve 77 and a resilient decoupling pad 78 prevent direct acoustical coupling between diaphragm 32 and the axial tunnel 22, which serves as the audio output channel.

A slanted channel 79 connects the bottom of resonant chamber 35 to the tunnel 22. A second channel 82 extends obliquely through the rearward end of housing 20 and opens into an external threaded male connector 84 which cooperates with a female connector 86 to complete the acoustical link between the resonant chamber 35 of the tuner and an output tube 87 which pipes the selected audio frequencies to microphone 12.

In operation of the embodiment described above, the sounds picked up by microphone 5 cause vibrations in loudspeaker 8 which are coupled through plate 28 and transmitting rod 30 to diaphragm 32. Depending upon the position of diaphragm 32 within resonant chamber 35 the chamber will resonate at a particular frequency which is sufficiently narrow for the intended purposes. Since the amplitude of the resonant frequency is much larger than that of the nonresonant frequencies, the acoustical energy at this frequency is preferentially transmitted through channel 79, tunnel 22 and channel 82 to the output tube 87. The acoustical output of tube 87 is converted by microphone 12 to an electrical signal which is amplified by amplifier 13 and fed to headphones 15 and meter 17.

Thus, the user may listen to a relatively narrow range of audio frequencies as determined by the position of diaphragm 32, which range may correspond, for example, to the heart beat of the fetus in order to distinguish it from the mother's heart beat. To alter the particular frequency range, tuning knob 49 is turned causing diaphragm 32 to move in or out thus varying the resonant frequency of chamber 35. Meter 17 provides a visual indication of the energy received in the selected spectrum portion; therefore by comparing the readings of meters 11 and 17 the user may be cognizant of the portion of the received signal within the selected spectrum.

The invention may further include an alternative input to the resonant chamber 35. For this purpose, the bottom portion of chamber 35 includes a short cavity 90 into which there extends a hollow threaded nipple 92. A hollow threaded female connector 94 is used to connect a hollow plastic tube 96 which is connected to a standard medical stethoscope head 98 illustrated in dashed lines. In this case, the mechanical energy detected by head 98 is coupled through tube 96 and screw 92 directly into the cavity 90 of resonant chamber 35. The device is tuned in the same manner as described above and the operation of the remaining portion of the apparatus is identical to that described. When using this alternative embodiment, switch 7 may, if desired, be opened in order to isolate diaphragm 32 from microphone 5. Alternatively both electrical and air conducting pickups may be simultaneously employed to advantage in some situations.

Although a preferred embodiment of the device has been illustrated and described the invention is not limited thereto and should be defined by reference to the following claims.

What is claimed is:

1. A stethoscope for analyzing a selected narrow-band audio spectrum portion, comprising
   a mechanically tunable filter having a resonant acoustic chamber tunable to selected audio spectrum portions,
   input means for coupling a wide range of acoustical frequencies to said resonant chamber, said input means comprising a microphone for detecting a relatively wide range of acoustical energy, first amplifier means connected to the output of said microphone, an electrical-acoustical transducer connected to the output of said first amplifier means, and means acoustically coupling said transducer and said resonant chamber,
   an output electrical-acoustical transducer,
   acoustical-electrical transducer means for coupling an electrical signal representative of substantially only those frequencies within said spectrum portion from said filter to said output electrical-acoustical transducer,
   second amplifier means for amplifying the output of said acoustical-electrical transducer, and
   meter means responsive to said second amplifier means for indicating the magnitude of the acoustical signals within said selected spectrum portion.

2. A stethoscope according to claim 1, wherein said input means comprises an audio duct leading into said resonant chamber.

3. A stethoscope according to claim 1, wherein said resonant chamber includes a movable diaphragm, and said means acoustically coupling comprises sound transmitting means for mechanically coupling the vibrations of said electrical-acoustical transducer to said diaphragm.

4. A stethoscope according to claim 3, further including additional meter means for indicating the magnitude of the signals within said selected spectrum portion as compared to said wide range of acoustical frequencies.

5. A stethoscope according to claim 4, including variable resistance means connected to the input of at least one of said meters for calibrating said meters.

6. A stethoscope according to claim 5, wherein said means for moving said diaphragm comprises a threaded shaft adapted to axially transport said diaphragm, one end of said shaft extending from said tuner, and means exterior of said tuner for indicating the number of turns of said shaft.

7. A stethoscope for analyzing a selected narrow band audio spectrum portion, comprising a first microphone responsive to a wide range of input acoustical frequencies, variable gain amplifier means connected to the output of said microphone, adjustable mechanical tuning means for passing said selected audio spectrum portion, electrical-acoustical transducer means for coupling the output of said variable gain amplifier to the input of said tuning means, a second microphone acoustically coupled to the output of said tuning means for detecting acoustical energy within said audio spectrum portion, second amplifier means responsive to the output of said second microphone, and an output meter for indicting the magnitude of the output of said second amplifier means, with respect to the output of said variable gain amplifier means.

8. A stethoscope according to claim 7, including an additional meter coupled to the output of said variable gain amplifier means, said output meter and additional meter respectively indicating the magnitudes of the acoustical energy within the input frequency range and the acoustical energy within said selected spectrum portion.

9. A stethoscope according to claim 8, wherein said second amplifier means has a fixed gain adjusted so that said first and second meters will have substantially identical readings when a frequency in the center of said selected spectrum portion is coupled to said first microphone.

10. A stethoscope according to claim 9, further comprising a second variable gain amplifier connected between the output of said first named variable gain amplifier means and said output meter, and a third variable gain amplifier connected between the output of said second amplifier means and said additional meter, and means for maintaining the gains of said second and third variable gain amplifiers substantially equal.

References Cited

UNITED STATES PATENTS

| | | | |
|---|---|---|---|
| 2,755,336 | 7/1956 | Zener | 179—1 |
| 3,187,098 | 6/1965 | Farrar et al. | 179—1 |
| 3,246,721 | 4/1966 | Martin | 179—1 |

FOREIGN PATENTS 1,048,270  11/1966  Great Britain.

KATHLEEN H. CLAFFY, *Primary Examiner.*

R. P. TAYLOR, *Assistant Examiner.*

UNITED STATES PATENT OFFICE
CERTIFICATE OF CORRECTION

Patent No. 3,396,241                                                  August 6, 1968

Russell K. Anderson et al.

It is certified that error appears in the above identified patent and that said Letters Patent are hereby corrected as shown below:

Column 3, line 24, "analyzing" should read -- analyze --.
Column 6, line 28, "indicting" should read -- indicating --.

Signed and sealed this 30th day of December 1969.

(SEAL)
Attest:

Edward M. Fletcher, Jr.                            WILLIAM E. SCHUYLER, JR.
Attesting Officer                                               Commissioner of Patents